INVENTOR
Robert W. Rue

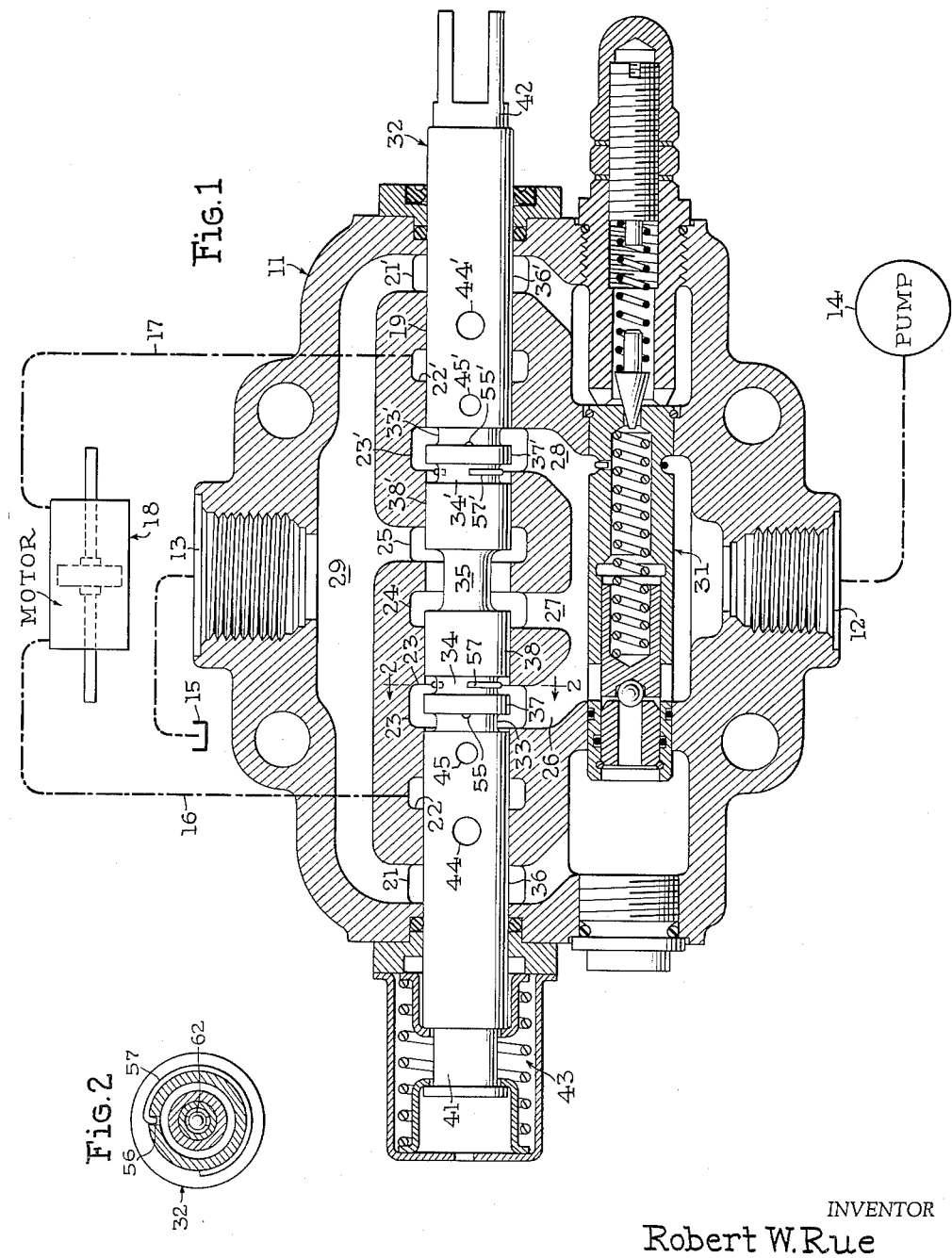

BY Dodge and Sons
ATTORNEYS 2,988,106
Patented June 13, 1961

2,988,106
CONTROL VALVE
Robert W. Rue, Kalamazoo, Mich., assignor to The New York Air Brake Company, a corporation of New Jersey
Filed May 9, 1960, Ser. No. 27,810
6 Claims. (Cl. 137—621)

This invention relates to control valves for double-acting fluid pressure motors.

In many installations in which these fluid pressure motors are used, the external loads applied to the motor frequently cause it to move at a rate faster than that with which the pump can keep pace. When this happens, the motor cavitates and the operator loses control. This, obviously, is an undesirable situation.

The object of this invention is to provide, in the movable element of the control valve, a device for preventing the rate of flow of exhaust fluid returning from the motor to the reservoir from exceeding the rate of flow of the supply fluid delivered to the fluid pressure motor by the pump. This device maintains positive control and prevents cavitation in the fluid pressure motor even when the pump delivery rate is quite low.

The location of the flow-regulating device in the movable element of the control valve enables that device to be operated by movement of the movable element, thus resulting in an efficient structure. This arrangement also is desirable because it permits installation and removal of the device from the hydraulic system simply by changing the movable element.

It is customary, in valves of this type, to provide a check valve for preventing dropping of the load held by the fluid pressure motor during the time interval required for the pump to build up operating pressure after the movable element is first shifted away from its "neutral" position. A further feature of the present invention is that the flow-regulating device it provides may incorporate such a check valve.

The preferred embodiment of the invention will now be described in detail with reference to the accompanying drawings, in which:

FIG. 1 is an axial sectional view of a three-position open-center sliding plunger type control valve incorporating the invention; the valve plunger being shown in the "neutral" position.

FIG. 2 is an enlarged sectional view taken on line 2—2 of FIG. 1 showing the installation of the restrictor pin.

Figure 3:
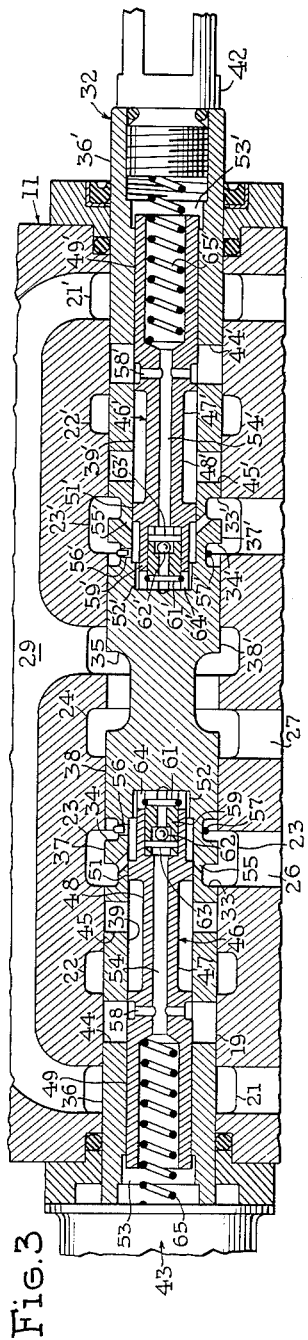
FIG. 3 is an enlarged view of a portion of the valve shown in FIG. 1 showing, in section, the details of the flow-regulating device.

Referring to FIGS. 1 through 3, the control valve comprises a housing 11 having inlet and exhaust ports 12 and 13 which are connected with the pump 14 and sump 15, respectively, and two motor ports (not shown) which are connected by lines 16 and 17 with the opposite sides of a double-acting fluid pressure motor 18. Extending through the housing is a bore 19 encircled by eight longitudinally spaced annular chambers 21, 22, 23, 24, 25, 21', 22' and 23'. Chambers 23, 24 and 23' communicate with inlet port 12 via three parallel supply passages 26, 27 and 28, while chambers 21, 21' and 25 communicate with exhaust port 13 via exhaust manifold 29. Chambers 22 and 22' communicate with the motor ports (not shown). A conventional relief valve 31 limits the pressure in the supply passages by by-passing fluid to the exhaust manifold 29.

Mounted in bore 19 is a slidable valve plunger 32 formed with five longitudinally spaced grooves 33, 34, 35, 33' and 34' which define valve lands 36, 37, 38, 36', 37' and 38'. Extending inward from opposite ends of the valve plunger 32 are two axial bores 39 and 39' whose outer ends are closed and sealed by plugs 41 and 42; the plug 41 forming part of the centering spring device 43. The bore 39 is intersected by two spaced sets of radial passages 44 and 45, and two similar sets of passages 44' and 45' intersect the bore 39'.

The illustrated control valve employs two of the flow-regulating devices 46 and 46' provided by this invention and, since these two devices are identical, only the device 46 will be described in detail. As shown in FIG. 2, the flow-regulating device 46 comprises a by-pass valve 47 which is slidable in the bore 39 and which is formed with annular groove 48 that defines two lands 49 and 51. As will appear below, this groove 48 and the land 49 serve to control communication between the two sets of radial passages 44 and 45. The portions of axial bore 39 at opposite ends of the by-pass valve 47 constitute pressure chambers 52 and 53 and these chambers are interconnected by a restricted axial passage 54 which is formed in the by-pass valve 47. A plurality of unrestricted diagonal passages 55 open into the annular groove 33 and provide a flow path from annular chamber 23 to pressure chamber 52. A parallel flow path is afforded by radial passage 56 which is restricted by the end of a wire ring 57 that is positioned in the groove 34 (see FIG. 2) and encircles the axis of the valve plunger 32. The restriction to flow afforded by passage 56 is about four times as great as the restriction afforded by axial bore 54. Pressure chamber 53 communicates with the radial passages 44 through radial passages 58 which intersect the restricted axial bore 54 near its left end.

The right end of restricted axial bore 54 is counterbored to receive a check valve seat insert 59 which is held in place by snap ring 61. A ball check valve 62 is retained in the insert 59 by a pin 63 and is arranged to engage the seat which is formed in the insert. The right end of the by-pass valve 47 is provided with a plurality of radial slots 64 which define a flow path between pressure chamber 52 and the restricted axial passage 54.

*Operation*

In operation, the control valve is connected into the hydraulic circuit in the manner shown in FIG. 1. When the valve plunger 32 is in the neutral position shown in that figure, fluid delivered by pump 14 and entering inlet port 12 flows to the sump 15 through supply passage 27, annular chamber 24, annular groove 35, annular chamber 25, exhaust manifold 29, and exhaust port 13. Plunger lands 36 and 36' overlie annular chambers 22 and 22', respectively, and thus isolate the opposite sides of motor 18 from each other and from the inlet and exhaust ports. This is the conventional "neutral" or "hold" position.

Figure 4:
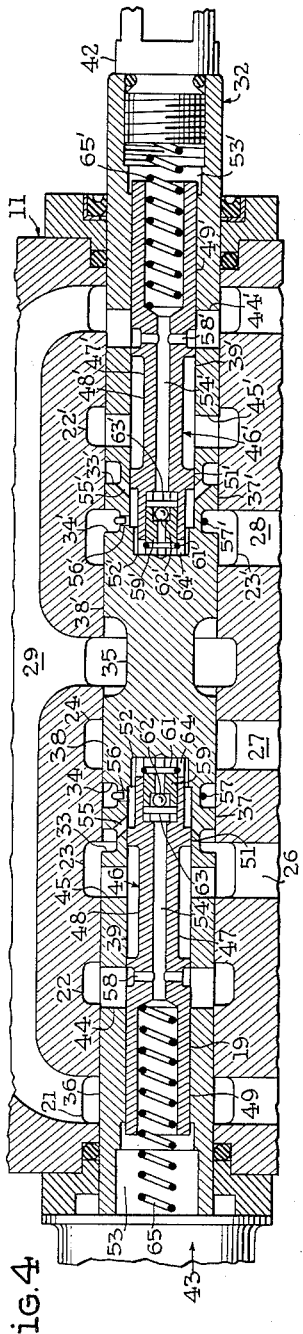
FIG. 4 is a view similar to FIG. 3 showing the valve plunger in a second operative position.

When the valve plunger 32 is shifted to the right to the FIG. 4 position, valve lands 38 and 38' interrupt the unloading path between inlet port 12 and exhaust port 13. The hydraulic fluid delivered by the pump 14 now passes through supply passage 26 to the annular chamber 23 and from there to the annular chamber 22 along a path comprising diagonal passages 55, pressure chamber 52, slots 64, restricted axial passage 54, and radial passages 58 and 44. Because of the fact that passage 54 is restricted, fluid flowing along this path experiences a drop in pressure as it passes from pressure chamber 52 to the radial passages 58, thus unbalancing the pressures in the two presure chambers 52 and 53. The opposite ends of the by-pass valve 47 constitute reaction surfaces which are subject to the pressures in the two pressure chambers and, therefore, this unbalance develops a net force which tends to shift that valve to the left against the bias of spring 65. When the pressure differential between chambers 52 and 53, and consequently the net force, is sufficient to overcome the bias of spring 65, the valve 47 shifts thus allowing land 49 to uncover radial passages 44 and permitting groove 48 to interconnect these passages 45. Since the groove 48 affords a relatively unrestricted flow path, the major portion of the fluid flowing to the double-acting motor 18 passes through this groove. The small pilot flow which passes through the axial bore 54 is merely sufficient to maintain the by-pass valve 47 in an open position.

A portion of the fluid delivered by pump 14 also passes through supply passage 28 to annular chamber 23' and from there to the exhaust port 13 along a path comprising restricted radial passage 56', pressure chamber 52', restricted axial bore 54', radial passages 58' and 44', annular chamber 21', and exhaust manifold 29. It should be noticed here that inasmuch as lands 36' and 37' isolate diagonal passages 55', this pilot flow must pass through the highly restricted passage 56'. Because of this, the pressure differential between annular chambers 23' and 21' required to produce a pilot flow through axial bore 54' sufficient to shift by-pass valve 47' against the bias of spring 65' is much greater than the pressure differential between annular chambers 23 and 22 required to produce the corresponding flow through axial bore 54. When this differential pressure has been achieved, by-pass valve 47' will shift to the right and permit groove 48' to interconnect radial passages 44' and 45' and thus provide a relatively unrestricted exhaust path for the return fluid flowing from double-acting motor 18 to annular chamber 22'. Motor 18 now will commence to move to the right.

If the external load applied to the double-acting motor 18 causes it to move at a rate faster than that with which the pump can keep pace, the pressure in the supply path connecting inlet port 12 with the left side of the motor 18 will decrease. Since this pressure also is effective in annular chamber 23', this action will reduce the pressure differential available to force fluid through restricted radial passage 56' and restricted axial bore 54'. As a result, the rate of flow through this path and the pressure differential between chambers 52' and 53' will decrease and spring 65' will shift by-pass valve 47' to the left thereby causing land 49' to partially restrict the return flow from motor 18 which is passing through groove 48' and radial passages 44'. Since, as mentioned above, the pressure differential between annular chambers 23' and 21' required to open by-pass valve 47' is much greater than the differential between chambers 22 and 23 required to open by-pass valve 47, the valve 47' will begin to close at a time when the pressure in inlet port 12 is still adequate to force oil into the expanding side of motor 18. The action of the flow-regulating device 46' is such that the degree of restriction created by land 49' is always sufficient to ensure that the rate of flow of fluid returning from motor 18 through line 17 is equal to the rate of flow of fluid to motor 18 through line 16. Because of this, cavitation is prevented and positive control action is maintained.

Figure 5:
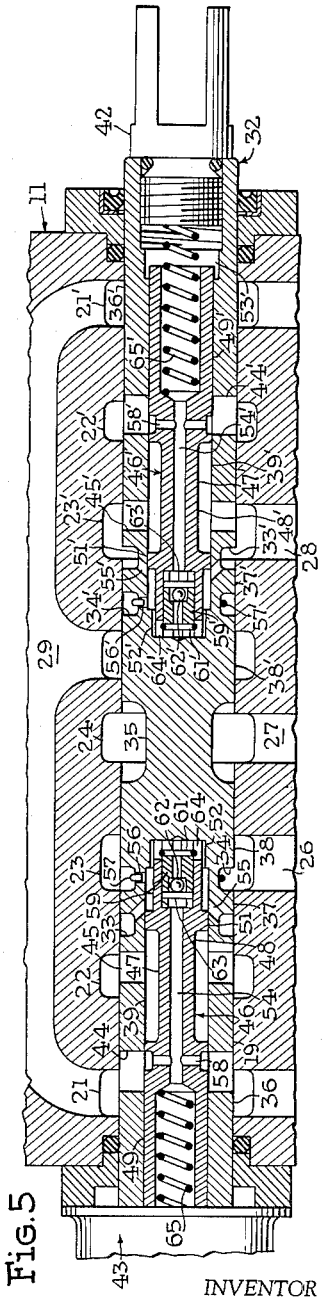
FIG. 5 is a view similar to FIG. 3 showing the valve plunger in a third operative position.

When the valve plunger 32 is shifted to the left from the neutral position of FIG. 1 to the position shown in FIG. 5, fluid delivered by pump 14 is transmitted to the right side of double-acting motor 18 along a path which includes supply passage 28, and annular chambers 22' and 23', and which will be apparent from the foregoing discussion in connection with FIG. 4. Similarly, return flow from motor 18 will pass to the sump along an exhaust path which includes annular chambers 22 and 21 and which is analogous to the exhaust path established in FIG. 4. In this case, the flow-regulating device 46 functions to equalize the rates of supply to and exhaust from motor 18. It will be noted that here the pilot flow passing through axial bore 54' can pass through the unrestricted diagonal passages 55', whereas the pilot flow through axial bore 54 must pass through the highly restricted passage 56. Thus, as in the previous case, anti-cavitation action will be initiated while supply pressure is still sufficient to force oil into the expanding side of motor 18.

In the preferred embodiment of the invention, the valve plunger 32 includes two flow-regulating devices 46 and 46', and thus is capable of preventing overrunning of the motor 18 in either direction. When unidirectional overrunning loads are contemplated, the flow-regulating device in the supply path leading to the motor 18 under those conditions can be eliminated. This is so because the control action afforded by the invention is exercised exclusively by the by-pass valve in the exhaust path leading from the motor.

It should be mentioned that while the check valve 63 performs no function in connection with the cavitation-preventing operation of the invention, it is included in the preferred embodiment for an important reason. If, when the valve plunger 32 is first shifted away from its "neutral" position the external load on motor 18 is such as to contract that side to which oil is to be supplied, the check valve 63 (or 63') will prevent dropping of the load during the time interval required for the pump to build up operating pressure.

As stated previously, the drawings and description relate only to a preferred embodiment of the invention. Since many changes can be made in this embodiment without departing from the inventive concept, the following claims should provide the sole measure of the scope of the invention.

What is claimed is:

1. In a valve having a housing containing an inlet and an exhaust port, two motor ports, and a movable valve member having a first position in which each motor port is isolated from the other three ports, a second position in which the inlet port is isolated from the exhaust port, a supply path is established between the inlet port and the first motor port and an exhaust path is established between the second motor port and the exhaust port, and a third position in which the inlet port is isolated from the exhaust port, a supply path is established between the inlet port and the second motor port, and an exhaust path is established between the first motor port and the exhaust port, and wherein the supply and exhaust paths leading to and from each motor port have a common portion in the movable valve member, the improvement which comprises a by-pass valve carried by the movable valve member and located in the one of said common portions which communicates with the first motor port, the valve being shiftable in path-opening and path-closing directions; first and second pressure chambers located in the movable valve member; a first restricted passage interconnecting the two pressure chambers; a second unrestricted passage connecting the first pressure chamber with the inlet port when the movable valve member is in the second position but being closed by movement of that member when it is shifted to the third position; a third restricted passage connecting the first pressure chamber with the inlet port when the movable valve member is in the third position; a fourth passage connecting the second pressure chamber with the first motor port when the movable valve member is in the second position; a fifth passage connecting the second pressure chamber with the exhaust port when the movable valve member is in the third position; a pair of opposed reaction surfaces carried by the by-pass valve, each being subject to the pressure in one of the pressure chambers, the surfaces being so arranged that the force developed by the pressure in the first pressure chamber urges the by-pass valve in the path-opening direction and the force developed by the pressure in the second pressure chamber urges the by-pass valve in the path-closing direction; and a spring reacting between the movable valve member and the by-pass valve and urging the latter in the path-closing direction.

2. The improvement defined in claim 1 which includes a check valve located in the first restricted passage for preventing flow to the first pressure chamber.

3. The improvement defined in claim 1 in which the third restricted passage is more restricted than the first restricted passage.

4. The improvement defined in claim 1 including a second by-pass valve carried by the movable valve member and located in the one of said common portions which communicates with the second motor port, the valve being shiftable in path-opening and path-closing directions; third and fourth pressure chambers located in the movable valve member; a sixth restricted passage interconnecting the third and fourth pressure chambers; a seventh unrestricted passage connecting the third pressure chamber with the inlet port when the movable valve member is in the third position but being closed by movement of that member when it is shifted to the second position; an eighth restricted passage connecting the third pressure chamber with the inlet port when the movable valve member is in the second position; a ninth passage connecting the fourth pressure chamber with the second motor port when the movable valve member is in the third position; a tenth passage connecting the fourth pressure chamber with the exhaust port when the movable valve member is in the second position; a pair of opposed reaction surfaces carried by the second by-pass valve, each being subject to the pressure in one of said third and fourth pressure chambers, the surfaces being so arranged that the force developed by the pressure in the third pressure chamber urges the second by-pass valve in the path-opening direction and the force developed by the pressure in the fourth pressure chamber urges the second by-pass valve in the path-closing direction; and a second spring reacting between the movable valve member and the second by-pass valve and urging the latter in the path-closing direction.

5. The improvement defined in claim 4 in which the third restricted passage is more restricted than the first restricted passage; and the eighth restricted passage is more restricted than the sixth restricted passage.

6. The improvement defined in claim 4 which includes a first check valve located in the first restricted passage for preventing flow to the first pressure chamber; and a second check valve located in the sixth restricted passage for preventing flow to the third pressure chamber.

No references cited.